United States Patent [19]

Steiner et al.

[11] Patent Number: 6,079,608
[45] Date of Patent: Jun. 27, 2000

[54] METHOD FOR COMPACTION AND SUBSEQUENT WELDING OF ELECTRIC CONDUCTORS

[75] Inventors: Ernst Steiner, Heuchelheim; Dieter Stroh, Wettenberg; Heinz Götz, Amöneburg, all of Germany

[73] Assignee: Schunk Ultraschalltechnik GmbH, Wettenberg, Germany

[21] Appl. No.: 09/338,867

[22] Filed: Jun. 23, 1999

Related U.S. Application Data

[62] Division of application No. 08/624,647, May 15, 1996, Pat. No. 5,941,443.

[30] Foreign Application Priority Data

Jan. 5, 1995 [DE] Germany .............................. 43 35 108

[51] Int. Cl.[7] .............................. B23K 1/06; B23K 20/10
[52] U.S. Cl. ..................... 228/110.1; 228/1.1; 228/103
[58] Field of Search .............................. 228/9, 10, 110.1, 228/1.1, 102, 103, 105

[56] References Cited

U.S. PATENT DOCUMENTS 3,697,837  10/1972  Umbaugh .
4,409,659  10/1983  Devine ..................................... 364/475
4,631,685  12/1986  Peter ....................................... 364/476
4,646,957   3/1987  Nuss .
4,711,984  12/1987  Bilge et al. .............................. 219/110
4,799,614   1/1989  Welter et al. .
4,826,067   5/1989  Butler .
4,867,370   9/1989  Welter et al. .
4,869,419   9/1989  Nuss .
5,192,015   3/1993  Ingle et al. .............................. 228/111
5,323,952   6/1994  Kato et al. .............................. 228/102
5,360,155  11/1994  Ooki et al. .............................. 228/1.1
5,613,000   3/1997  Takahashi et al. .
5,846,377  12/1998  Frantz et al. ............................ 156/359
5,855,706   1/1999  Grewell ................................... 156/64
5,941,443   8/1999  Steiner et al. ........................... 228/1.1

Primary Examiner—Gregory Mills
Assistant Examiner—Kiley Stoner
Attorney, Agent, or Firm—Dennison, Scheiner, Schultz & Wakeman

[57] ABSTRACT

The invention relates to a process for welding electric conductors employing ultrasound following compaction. The process comprises compaction of the conductors in a compaction area by adjusting height and width up to a preset contact force and ultrasonically welding according to predetermined, stored parameters.

15 Claims, 8 Drawing Sheets

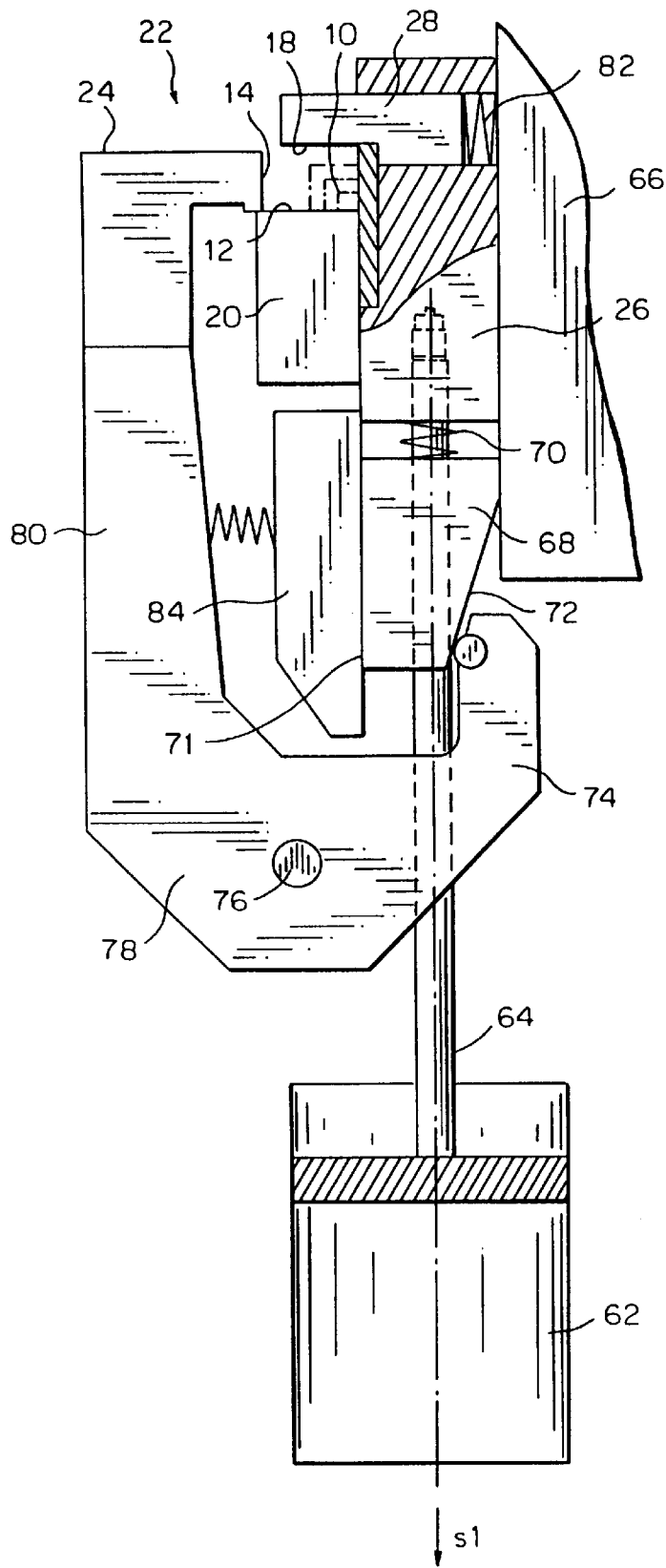
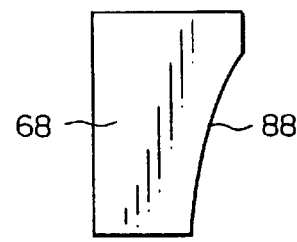
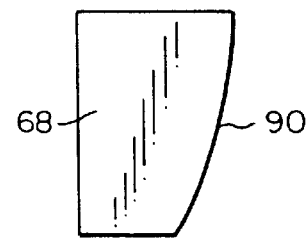
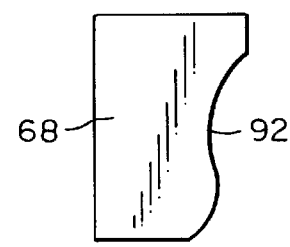

METHOD FOR COMPACTION AND SUBSEQUENT WELDING OF ELECTRIC CONDUCTORS

This application is a divisional of Ser. No. 08/624,647 filed May 15, 1996, now U.S. Pat. No. 5,941,443.

FIELD OF THE INVENTION

The invention relates to a method for compaction and subsequent welding of electric conductors, in particular for manufacturing through-type or end nodes of strands using ultrasound in a compaction area adaptable to the conductors and adjustable in height and width, with the conductors to be welded first being compacted and then welded.

Furthermore, the invention relates to a device for compaction and subsequent welding of electric conductors, in particular for manufacturing through-type and end nodes of strands, comprising a sonotrode generating ultrasonic vibrations, of which one surface is a first lateral limiting surface of a compaction area adjustable in height and width, preferably rectangular in cross-section and open at the end, the other limiting surfaces of said compaction area are surfaces of a multi-part counter-electrode, where said counter-electrode comprises a first part movable approximately parallel to the sonotrode surface and forming a (second) limiting surface approximately vertical to the sonotrode surface, and a part movable parallel to the second limiting surface and forming a third limiting surface, from which part extends a movable portion forming a fourth limiting surface running approximately parallel to the sonotrode section, and contacting or almost contacting the first part of the counter-electrode at least during compaction and welding, and where the first part and the second part perform a positively coupled movement during compaction.

DESCRIPTION OF THE PRIOR ART

A suitable method and device for implementation of this method can be found in DE 37 19083, now U.S. Pat. No. 4,869,419. Here, the compaction area is altered in its cross-section both during compaction, i.e. pre-compaction, and during welding. In order to weld the conductors in the required quantity, the welding parameters have to be set individually for each conductor cross-section.

A method for controlling the process for quality checking during ultrasonic welding of workpieces is known from EP 0 208 310 B1. For this purpose, a sonotrode of an ultrasonic welding jig is lowered onto a workpiece positioned on an anvil in order to activate the ultrasonic energy, where a zero adjustment takes place as the sonotrode contacts the workpiece, in order to then activate the sonotrode and cause it to move over a required deformation travel.

A method is known from SU-A 757 337 for ultrasonic welding of thermoplastic substances whereby the sink-in depth of the sonotrode and hence the deformation of the workpieces during the welding operation is recorded by a travel pickup attached directly to the sonotrode. The welding operation ends when there is a change in the prefixed symbol of the second time derivation of the travel signal.

DE-OS 2 149 748 describes a method, a device and a system for manufacturing of connections to integrated circuits. In order to obtain better connections, the force introduced into a tool and also the energy imparted to the latter is controlled by the deformation of the parts being connected that has been ascertained by a travel pickup.

Control of the welding process using ultrasound is known from FR-A 2 303 172 in which the speed of the movement of a sonotrode during the welding process is measured and compared with given limit values, and the energy supply to the sonotrode is limited if presettable thresholds are exceeded.

Even if an attempt is made to optimize welding processes with the aid of known methods or devices, it is necessary to adjust the welding parameters individually depending on the parts to be welded, particularly when through-type and end nodes of strands are to be manufactured by ultrasonic welding.

OBJECTS OF THE INVENTION

The object underlying the present invention is to develop a method and a device of the type mentioned before such that defined welding is possible regardless of the cross-section even if conductors of differing cross-section are to be consecutively welded in an arbitrary sequence.

The problem is substantially solved by the method according to the invention in that regardless of the cross-section of the conductors to be welded, the conductors are compacted to a cross-section in which the compaction area has a given height/width ratio, and in that welding parameters necessary for welding the conductors are applied depending on the actual height or width or at least one other characteristic quantity of the compaction area.

Unlike in the prior art, a self-regulating welding process takes place that is initiated by a defined compaction of the conductors to be welded, where the compaction area has a defined height-width ratio at the end of compaction regardless of the conductor cross-sections to be welded. It is of course also possible to use another dimension of the compaction area to determine the cross-section of the compaction area. This is the case particularly when the compaction area has, for example, an oval cross-section or when the sonotrode and the associated single-stage counter-electrode engage in comb-like form.

After completion of pre-compaction, it is only necessary to determine the actual height or width of the compaction area or a corresponding dimension, using for example, a travel pickup, whereby the cross-section of the compacted conductors is directly provided on the basis of the fixed height/width ratio, and hence welding parameters such as welding energy, welding amplitude, welding time and welding pressure are applied that take this cross-section into account. To this end, associated welding parameters have been input beforehand into the welding apparatus for performing the process that depend on the cross-sections of the conductors to be welded, and these parameters can then be called up for the respective welding operations.

Based on the proposal in accordance with the invention, to perform the pre-compaction regardless of the conductor cross-section to the extent that the height is in a constant ratio to the width of the compaction area, it is no longer necessary to set the welding parameters after prior determination of the conductor cross-sections; it is instead only necessary to determine the width or height after completing pre-compaction, in order to derive the welding parameters directly from this value.

In an embodiment of the invention, it is provided that after completion of compaction, the compaction area alone is reduced vertically to the sonotrode area emitting ultrasound and limiting the compaction area. This results in better welding results in comparison with the method set forth in U.S. Pat. No. 4,869,419.

SUMMARY OF THE INVENTION

A method for welding electric conductors by means of ultrasound employing a compaction area adjustable in height and width and accommodating the conductors by which compaction area a limiting surface is formed by a sonotrode section of an ultrasonic welding apparatus is characterized by the following process steps:

insertion of the conductors to be welded in the compaction area;

compaction of the conductors in the compaction area up to a preset contact force with simultaneous alteration of the compaction area on the basis of a fixed height/width ratio;

determination of the height or width or at least one other characteristic quantity of the compaction area after completion of the compaction process;

calling up of stored welding parameters based on the height or width or characteristic quantity of the compaction area;

welding of the compacted conductors with simultaneous alteration of the compaction area exclusively in the direction of the sonotrode section or in the height and width of the compaction area, and removal of the conductors.

To permit quality monitoring and/or optimization of the welding parameters where necessary, it is furthermore provided that the actual welding parameters (actual values) be recorded and compared with the stored welding parameters (set point values).

A device of the type described at the outset for solving the problem underlying the invention is characterized in that the first part and the second part of the counterz electrode are positively coupled such that during compaction of the conductors, the height and the width of the compaction area are in a preset ratio to one another, and in that after completion of compaction, the first part is uncoupled from the second part such that one of the parts is adjustable alone during welding, with the distance between two opposite limiting surfaces of the compaction area being measurable before the start of welding. Here, it is preferably the height and/or width of the compaction area that is measured by a travel pickup.

To ensure that the cross-section of the pre-compaction area has the required ratio in respect of height and width, it is provided that one of the parts of the counter-electrode is positively driven, the movement of which is transmittable to the other part in order to move it in a positive manner. The parts of the counter-electrode can here be drivable separately or by a common drive unit.

In particular, the movement of the one part of the counter-electrode can be via a lever against which the other part is preloaded. This lever is preferably in the form of an unequal-sided "U" with a swivel axis passing through the transverse leg.

A further embodiment of the invention provides for a force from the first part of the counter-electrode designated as a slide to act in the direction of the movable section extending from the second part and subjected to a force in the direction of the first part, said section being movable along a stationary and curved projection such that when the distance between the sonotrode section and the opposite limiting surface is reduced during compaction the distance between the remaining side faces is proportionately reduced.

To ensure that after completion of pre-compaction, i.e. before the start of welding of the conductors, the compaction area is changeable only in its limiting surface extending vertically from the sonotrode, a locking means, such as an adjustable stop, acts on the first part.

A concept that is independently inventive for which protection is sought independently of the method underlying the invention relates to a device for compaction and subsequent welding of electric conductors, in particular for manufacturing through-type or end nodes of strands comprising a sonotrode generating ultrasonic vibrations of which one section is a first lateral limiting surface of a compaction area adjustable in height and width and open at the end, the other limiting surfaces of said compaction area being sections of a multi-part counter-electrode, where said counter-electrode comprises a first part adjustable to the sonotrode section and forming a second limiting surface approximately vertical to the sonotrode section, and a part movable parallel to the second limiting surface and forming a third limiting surface, from which part extends a movable section, such as a nose, forming a fourth limiting surface running approximately parallel to the sonotrode section, and contacting or almost contacting the first part of the counter-electrode at least during compaction and welding, and where the first part and the second part perform a positively coupled movement at least during compaction. The first part and the second part of the counter-electrode are adjustable in positively coupled form using a common drive unit, the second part is connected to the drive unit and is maintained by a spring element at a distance from an element having a run-off surface in the adjustment direction of the second part against which run-off surface presses an arm of a lever connected to the first part of the counter-electrode and pivotable about a stationary axis so that during compaction, the second part of the counter-electrode is adjustable using the drive unit together with the element having the run-off surface while simultaneously pivoting the lever, and upon reaching a presettable contact force onto conductors present in the compaction area, the force generated by the spring element to maintain the distance is overcome and the second part is adjustable in relation to the element having the run-off surface. Here the element having the run-off surface, against which the lever presses with its arm, is preferably formed by a taper or curved segment tapering in from the counter-electrode. Alternatively, it is possible for the run-off surface to have a concave or convex form or a combination of these forms.

The drive unit positively driving the first part and the second part of the counter-electrode comprises a pressure cylinder whose piston rod passes through the element having the run-off surface and is connected to the second part of the counter-electrode, where the spring element encloses the piston rod in the intermediate area between the part and the element.

By means of the device in accordance with the invention, proportional movement of the counter-electrode sections takes place during compaction of the conductors since a relative movement between the first part of the counter-electrode and the element spring-loaded against that counter-electrode on which presses the lever acting on the second part is not initially made, as these are adjusted practically as a single unit. Only when a given contact force is introduced by the pressure cylinder onto the part preferably having a nose is the spring force maintaining the distance between the counter-electrode and the part overcome, so that in the event of further force being introduced when the element having the nose is fixed, the counter-electrode can be moved for a further reduction of the compaction area. Since the taper element is stationary during this movement, the lever connected to the first part of the counter-electrode is no longer moved so that the compaction area width, which is preset by the first part, remains unchanged.

The height/width ratio of the compaction area is changed by the geometry of the run-off surface during compaction.

The invention is further characterized in that the first part and the second part of the counter-electrode are adjustable in positively coupled form by a common drive unit, in that the second part has a run-off surface running in its adjustment direction and is connected to the drive unit, in that an arm of a lever connected to the first part and pivotable about a stationary axis presses on the run-off surface, in that during compaction, the second part of the counter-electrode is adjustable while simultaneously pivoting the lever by using the drive unit, in that the first part is spring-loaded in relation to the lever such that the first part of the counter-electrode is uncoupled from further pivoting of the lever which is locked once a preset contact force on the conductors present in the compaction area has been attained.

Further details, advantages and features of the invention will be clear from the claims and from the features they describe, singly and/or in combination.

BRIEF DESCRIPTION OF THE DRAWINGS

FIG. 4 shows a section through an ultrasonic welding apparatus of a third embodiment with a variable compaction area;

FIGS. 4a–4c show details of an element having a run-off surface,

DETAILED DESCRIPTION OF THE INVENTION

Figure 1:
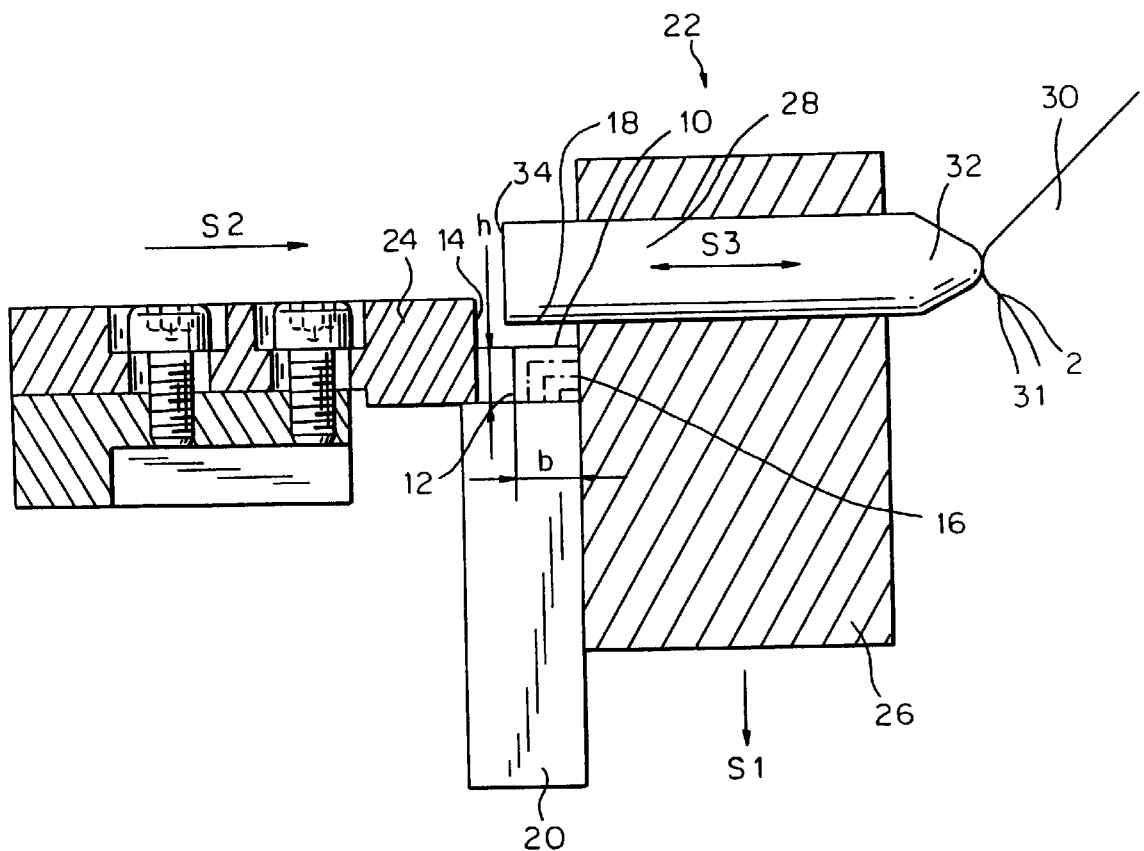
FIG. 1 shows a section through an ultrasonic welding apparatus of a first embodiment with a variable compaction area.

FIG. 1 shows a section through an ultrasonic welding device of a first embodiment where the compaction area (10) is adjustable according to the conductors to be welded. The ultrasonic welding apparatus itself can generally correspond to a design matching that of the RK 2000 device of the Minic Automatic made by Schunk Ultraschalltechnik GmbH, Wettenberg, Germany.

The compaction area (10) has a rectangular cross-section and is open at one end in order to insert the conductors to be welded. Compaction areas with other cross-sections are of course also conceivable, in particular ones with a trapezoidal cross-section.

The compaction area (10) is enclosed at four sides by limiting surfaces (12), (14), (16) and (18) which are formed on the one side by a surface of a sonotrode (20) and on the other sides by a multi-part counter-electrode (22).

The multi-part counter-electrode (22) comprises a slide (24) designated as the first part, said slide being movable along the limiting surface (12) provided by the sonotrode (20), the end of the slide forming the lateral limiting surface (14). The movement direction of the slide (24) is indicated by the arrow (S2). A second part, designated as an anvil (26), of the counter-electrode (22) is disposed opposite the slide (24) and is movable parallel to the limiting surface (14), i.e. vertical to the sonotrode surface (12) indicated by arrow (S1). The second part (26) holds a part (28) designated as a nose which is movable in accordance with the arrow (S3) parallel to the sonotrode surface (12).

To permit automatic and controlled welding regardless of the cross-section of the conductors to be welded without the device or the welding parameters having to be adjusted according to the cross-sections of the conductors to be welded, it is provided in accordance with the invention that the compaction area (10) has a height/width ratio which is fixed or which can be adjusted before compaction. This is intended to by symbolized by the rectangles of differing size drawn inside the compaction area (10). In a divergence from the drawing, the height/width ratio can also be altered in non-linear form during compaction. For changes of the compaction area, see FIGS. 7a, 7b.

To ensure that the ratio of width (b) to height (h) always has the required value during pre-compaction and up to completion of compaction, the parts (24) and (26) of the counter-electrode (22) including its nose (28) are positively coupled for movement.

In accordance with the embodiment in FIG. 1, the adjustment travel (S2) of the slide (24) is a function both of the adjustment travel (S1) of the anvil (26) movable in relation to the sonotrode surface (12) and of the adjustment travel (S3) of the nose (28).

To achieve positive coupling, the nose (28) which is adjustable vertically by the adjustment travel direction (S1), interacts on the one hand with the slide part (24), of the counter-electrode (22) and on the other hand, with a curved portion (30), which is formed as a nose. The facing end (32) of the nose is also formed with a curved portion.

The nose (28) is preloaded in the direction of the slide (24), which in its turn has a non-positive effect on the nose (28), where the limiting surface (14) formed by the slide is partially in contact with a parallel surface (34) of the nose (28).

If the anvil, i.e. the second part (26) is moved up, for example pneumatically, in the direction of the arrow (S1) and at the same time, the slide (24) is pneumatically moved, i.e. brought into non-positive contact with the surface (34) of the nose (28), the nose is moved along the curved portion (30), whereby together with a width change the height of the compaction area (10) is changed such that the height (h) is always at the ratio to the width (b) the ratio being preset by the form of the curved portion (30) along which the end (32) of the nose (28) is moved. If the curve is selected as a straight line, the height (h) changes in relation to the width (b) in a constant ratio.

The ratio of height (h) to width (b) consequently depends on the shape of the surfaces of the curved portion (30) and the end (32) sliding over one another. This is indicated by the different faces numbered (1), (2) and (3) of the curved portion (30).

As soon as pre-compaction is completed, the height (h) and the width (b) is determined using, for example, a travel pickup associated with the slide (24) or the second part (26) of the counter-electrode (22), in order to then call up previously stored welding parameters, such as welding energy, welding amplitude, welding time and welding pressure, and to weld the conductors present in the compaction area (10), while the height (h) of the compaction area

(10) is reduced at the same time, but without a controlled change in the width (b) because after completion of pre-compaction, the slide (24) is locked in position. Similar results can be obtained if the height of the compaction area is held constant and the width is reduced.

Since the nose (28) presses on the slide (24) regardless of the force acting on it via the slide (24), a surface contact between the slide (24) and the nose (28) is retained when the second part (26) is lowered, such that the conductors remain still completely enclosed by the limiting surfaces (12), (14), (16) and (18).

Figure 2:
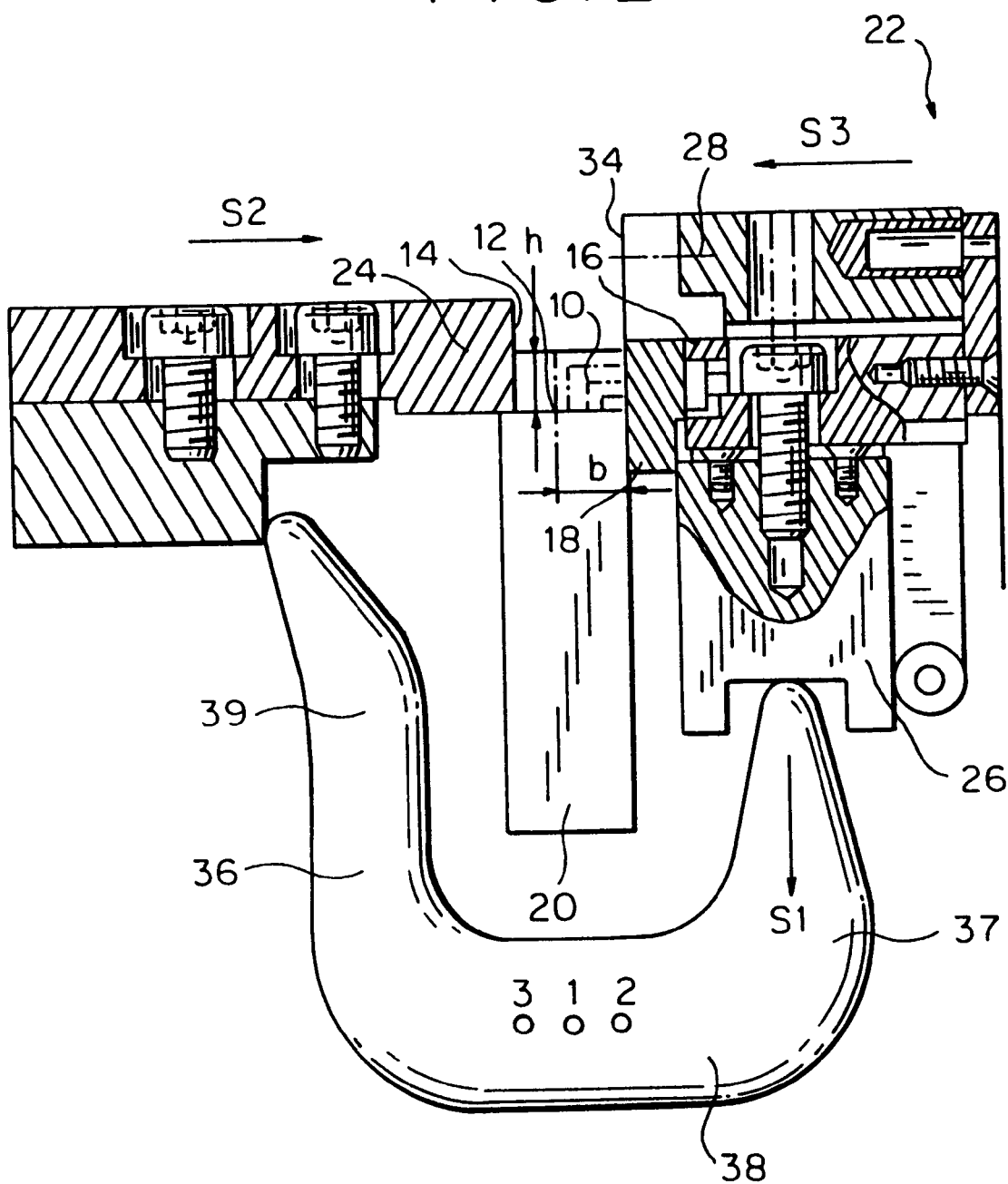
FIG. 2 shows a section through an ultrasonic welding apparatus of a second embodiment with a variable compaction area.

The embodiment in FIG. 2 differs from that in FIG. 1 to the extent that a positive coupling between the slide (24) and the second part (26) of the counter-electrode (22) holding the nose (28) is achieved by a lever (36) having the form of an unequal-sided "U" of which the rotational axis passes through its transverse leg (38). The appropriate pivotal points are numbered (1), (2) and (3), thereby presetting the transmission ratio of the translational movements (S1) and (S2). These movements in turn determine the ratio between height (h) and width (b) of the compaction area.

The slide (24) and the second part (26) holding the nose (28) are preferably driven pneumatically, with the slide (24) also being moved. The leg (39) of the lever (36) acts as a stop. The second part (26) of the counter-electrode (22) acts on the other, preferably shorter leg (37) to pivot the lever.

FIG. 4 shows a more detailed embodiment of an ultrasonic welding apparatus where the compaction area (10) is adjustable in height and width, and where the proposed positive coupling of the slide (24) and the second part (26) forming the counter-electrode (22) including the nose (28), is accomplished.

In accordance with the invention, positive coupling between the slide (24) and the second part (26) movable vertically in relation to the sonotrode (20) limiting surface (12) of the compaction area (10) is achieved using a single drive unit in the form of a pressure cylinder, such as a pneumatic cylinder (62), the piston rod (64) which is connected to the second part (26). Here, the second part (26) is movable in the longitudinal direction of the piston rod (64) between the sonotrode (20) and a tapered element (66) having a guide surface (65).

The piston rod also passes through the tapered element (68) which has a run-off surface or curve and is kept at a distance from the second part (26) of the counter-electrode (22) preferably by a cup spring or helical spring (70) that surrounds the piston rod (64).

The tapered element (68) is movable in the longitudinal direction of the piston rod between two parallel guide surfaces, i.e. the guide surface (65) and the opposite guide surface (71). The tapered element has a run-off surface (72) that is ramp-shaped in the embodiment such that the ramp tapers away from the second part (26).

A connecting element (78) rotatable about a stationary axis (76) and having the form of a lever in the shape of an "L" or unequal-sided "U" has a leg (74) which presses slidably on the run-off surface (72).

The long leg (80) opposite the leg (74) is rigidly connected to the slide (24) or forms a single unit with it. As a result, the slide (24) is moved in the direction of the second part (26) of the counter-electrode (22) or moved away from it by pivoting the lever (78), thus closing or opening the compaction area as the leg (74) slides along the run-off curve (72).

If the piston rod (64) is retracted into the cylinder (62), the second part (26) together with the tapered element (68) moves in the direction of the arrow (S1). As a result, the lever (78) is pivoted in the clockwise direction with the effect that the compaction area (10) is reduced in size, both in height (h) and width (b). The dimensions of the various elements are here matched to one another such that the surface (14) of the slide (24) presses against the nose (28) during compaction of conductors present in the compaction area (10).

As a result of the force caused by the spring (70), the second part (26) and the tapered element (68) move at a constant distance from one another during compaction, i.e. as a unit in the direction of the arrow (S1), such that the slide (24) is moved in the direction of the second part (26) of the counter-electrode (22) proportionately to the lowering of the nose (28), as a result of which the width (b) of the compaction area (10) is reduced.

As soon as a preset contact force is achieved on the conductors, the force of the spring (70) is overcome during further movement of the piston (64) in the direction of the arrow (S1), so that as a result, the second part (26) is moved in the direction of the tapered element without the tapered element moving. This in turn means that the lever (78) is no longer pivoted. As a result, the width (b) of compaction area (10) remains constant but, at the same time, the height (h) is reduced. Ultrasonic welding takes place at this same time.

To permit movement of the nose (28) together with the slide (24), the nose is supported in relation to the second part (26) by a spring (82). In addition, the lever leg (80) is spring-preloaded against an element (84) forming the guide surface (71).

As already mentioned, the height/width ratio of the compaction area (10) is altered to the required extent by the geometry of the run-off surface (72) along which the leg (74) of the lever (78) slides during compaction.

If the run-off surface (72) is straight, the height (h) alters in relation to the width (b) of the compaction area (10) in a constant, i.e. linear, ratio. It may, however, be required to change the height/width ratio of the compaction area (10) not in linear form, but for the height change to be, for example, greater than the width and vice versa. To achieve this, the run-off curve (72) can have geometries as numbered (88), (90) and (92) shown in FIGS. 4a, 4b and 4c. The run-off curve (88) is concave in shape and curve (90) convex. A combination of these is also possible, as in runoff curve (92).

Figure 7A:
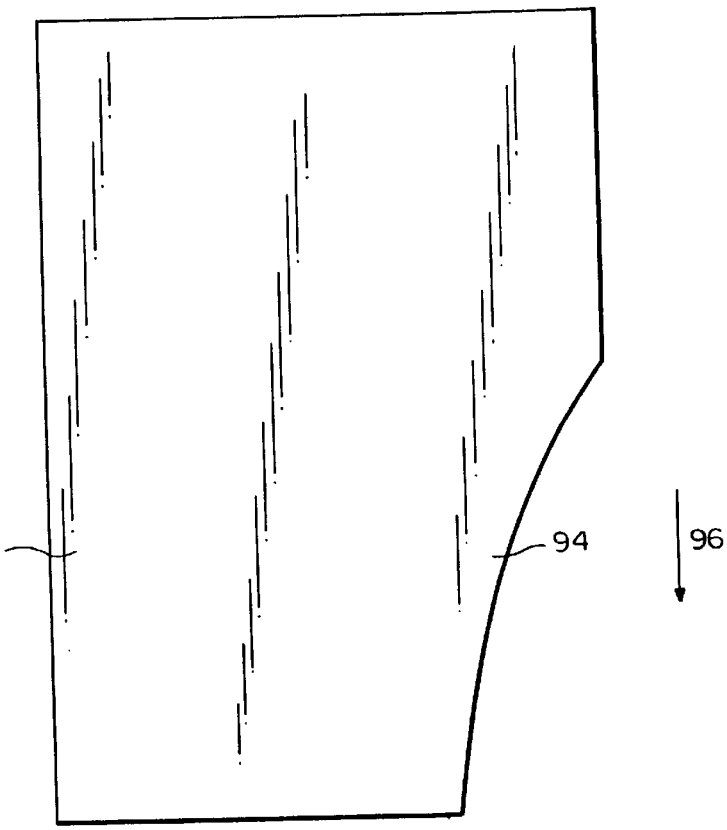
FIGS. 7a–7b show in enlarged form a first sequence curve with changes of the graph illustrating the compaction area.

The effect that the run-off curve has on the height/width ratio is shown in FIGS. 7a, 7b and 8a, 8b. FIG. 7a shows in enlarged form the element (68) and having a run-off curve (94) corresponding to the FIG. 4a curve (88) along which the lever element (78) slides in order to adjust the width (b) as a function of height (h) during compaction of electric conductors placed inside the compaction area.

Figure 7B:
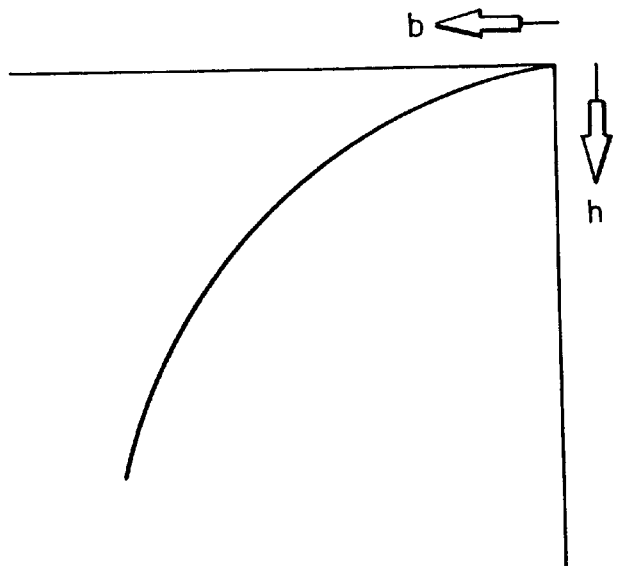
Figure 8B:
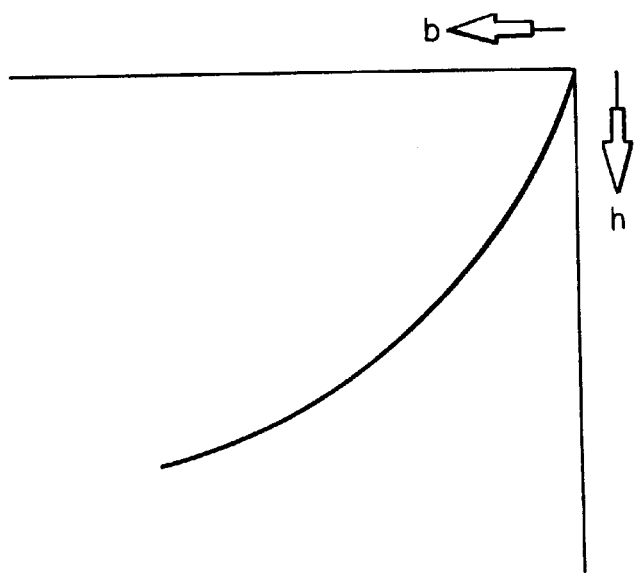

If the leg (74) slides along the run-off curve in the arrow direction (96), the height/width ratio changes continuously such that as the adjustment travel increases, i.e. the movement in the direction of the arrow (96), the width is reduced more steeply than the height. This is made clear by the graph in FIG. 7b. The FIGS. 7a, 7b show the height in relation to the width.

Figure 8A:
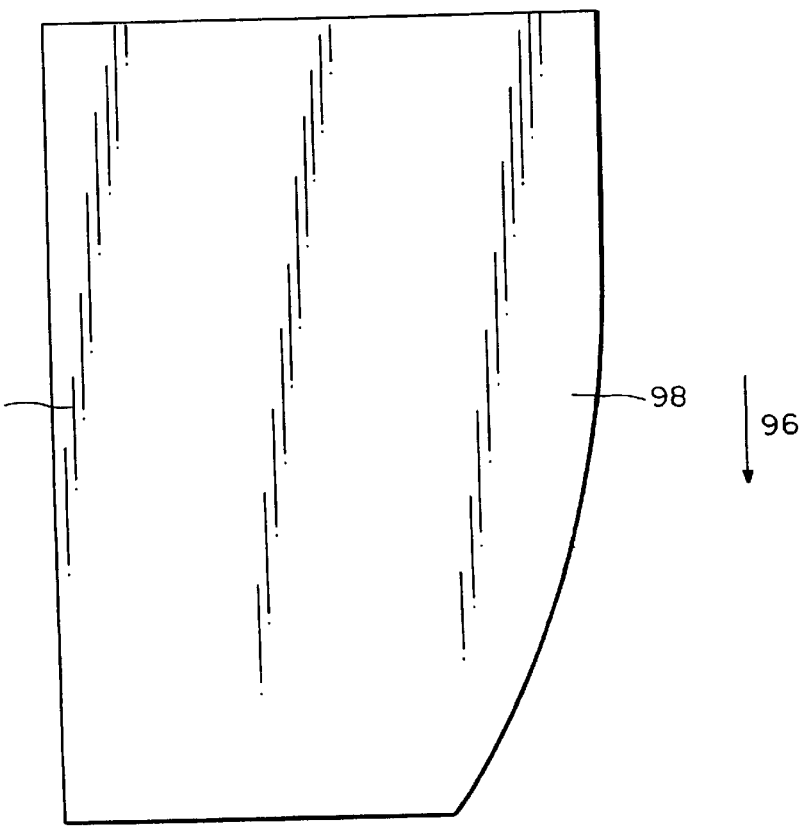
FIGS. 8a–8b show in enlarged form a second sequence curve with changes of the graph illustrating the compaction area.

In FIG. 8a, the element (68) has a convex run-off curve (98). As a result, the height of the compaction area (10) changes more steeply than the width (b) in accordance with FIG. 8b.

Figure 5:
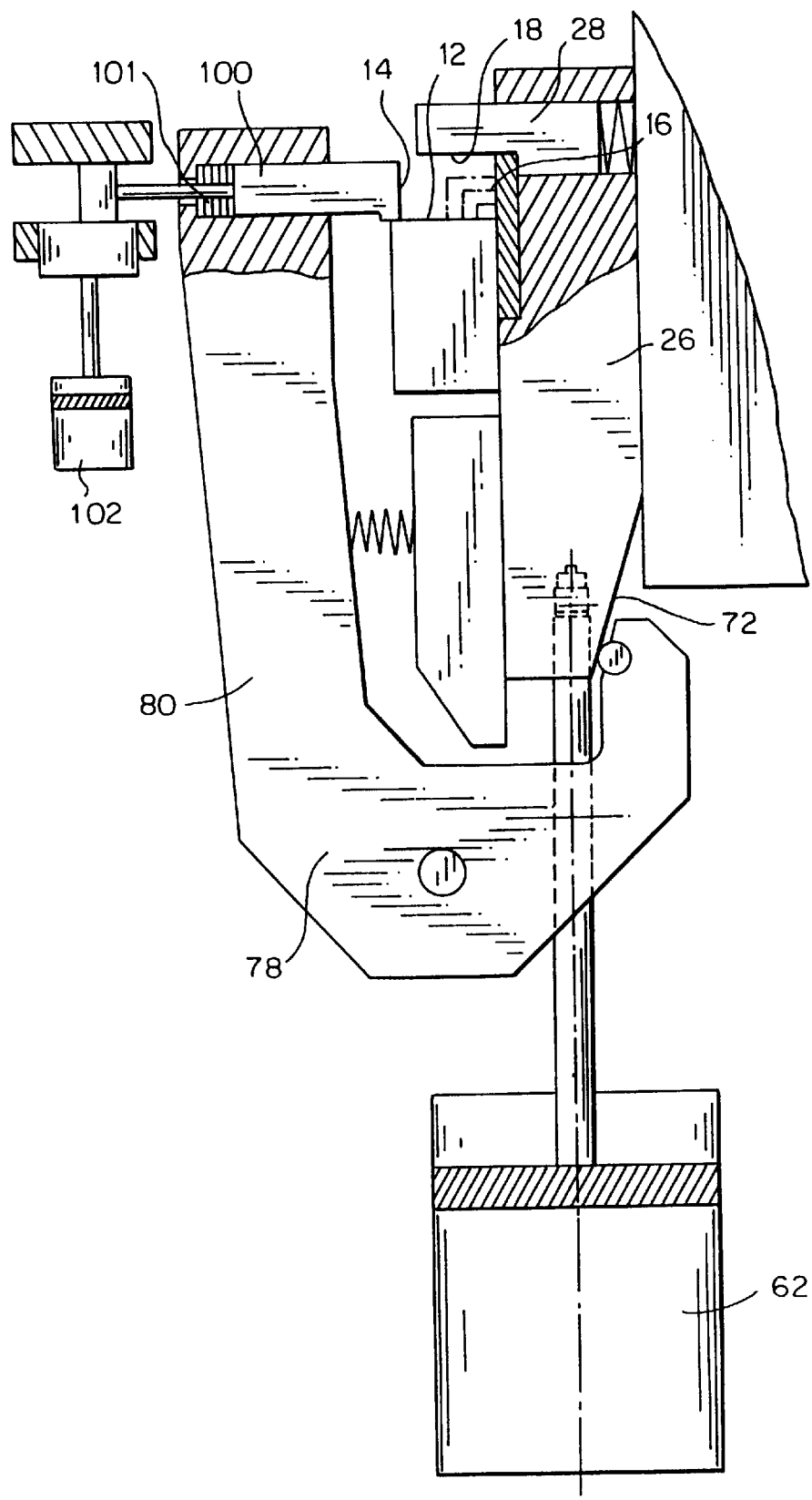
FIG. 5 shows a section through a fourth embodiment of an ultrasonic welding apparatus.

Appropriate run-off curves can apply in an ultrasonic welding apparatus shown in section in FIG. 5. Identical elements are identically numbered with regard to FIG. 4.

Unlike in the embodiment in FIG. 4, the compaction area (10) is formed by a slide (100) that is not rigidly linked to the lever element (78), but is movably disposed in the long leg (80). When compaction has been completed and the welding operation starts, the slide (100) is locked. As in the embodiment in FIG. 4, the spring force of a spring element (101) acting on the slide (100) is overcome. This threshold value is transmitted to a drive unit (locking cylinder) (102) acting on the slide (100) such that during a further pivoting of the lever (78), the slide (100) is locked. This also realizes the inventive feature, namely the change of the width (b) and height (h) of the compaction area (10) in a preset ratio determined by the run-off curve (72) during compaction of the electric strands, whereas after completion of compaction and ascertainment of the representative value for the compaction pressure, the area is changed only in height (h) with the slide (19) immovable, i.e. with unaltered width (b).

In the embodiment in FIG. 5, a coupling between the element having the run-off curve (12) and the second part of the counter-electrode which is movable vertically to the sonotrode surface can be dispensed with, instead, the second part (26) can have the run-off curve (72) in the area away from the compaction area (10).

Figure 6:
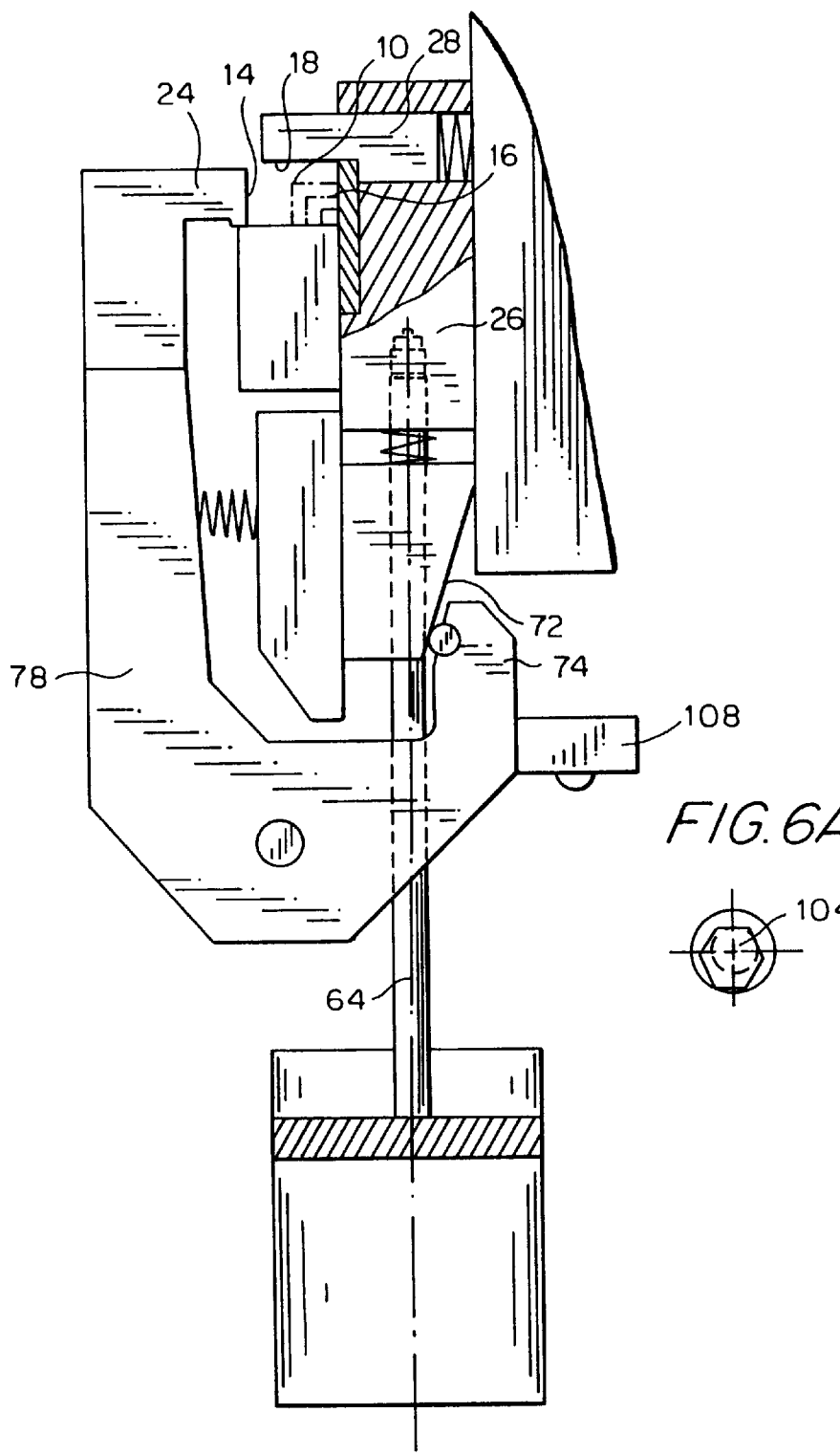
FIG. 6 shows a section through a fifth embodiment.
Figure 6A:
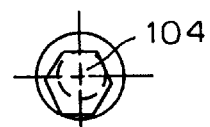
Figure 6B:
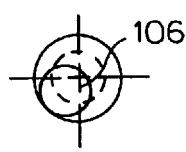

The embodiment in FIG. 6 differs from those in FIGS. 4 and 5 in that a self-determination of the cross-section of the compaction area does not take place. However, it is possible, on the basis of the features characterizing FIG. 4, for the height of the compaction area (10) limited by the limiting surfaces (14), (16) and (18) of the parts (24), (26) and (28) and the surface (12) of the sonotrode (20) to fall short of a settable width, since the pivoting movement of the lever arm (78) is limited by stops (104) and (106). To this end, a part (108) preferably projects laterally from the shorter leg (74) of the lever arm in order to press against the stop (104) or (106) whenever the width of the compaction area is no longer to be changed. If the piston (74) is then further retracted, the height of the compaction area (10) is reduced solely by lowering the second part (26) of the counter-electrode (22) and hence of the nose (28) without changing the width (b).

In order to permit variation of the width using the stops (104) and (106), the stops are eccentrically mounted.

With the teachings in accordance with the invention, strands of any cross-section, preferably in the range between 0.35 and 40 mm$^2$ can be ultrasonically welded to form, for example, through-type end nodes, where an automatic determination of the cross-section takes place whereby the previously filed welding parameters are in turn applied.

Figure 3:
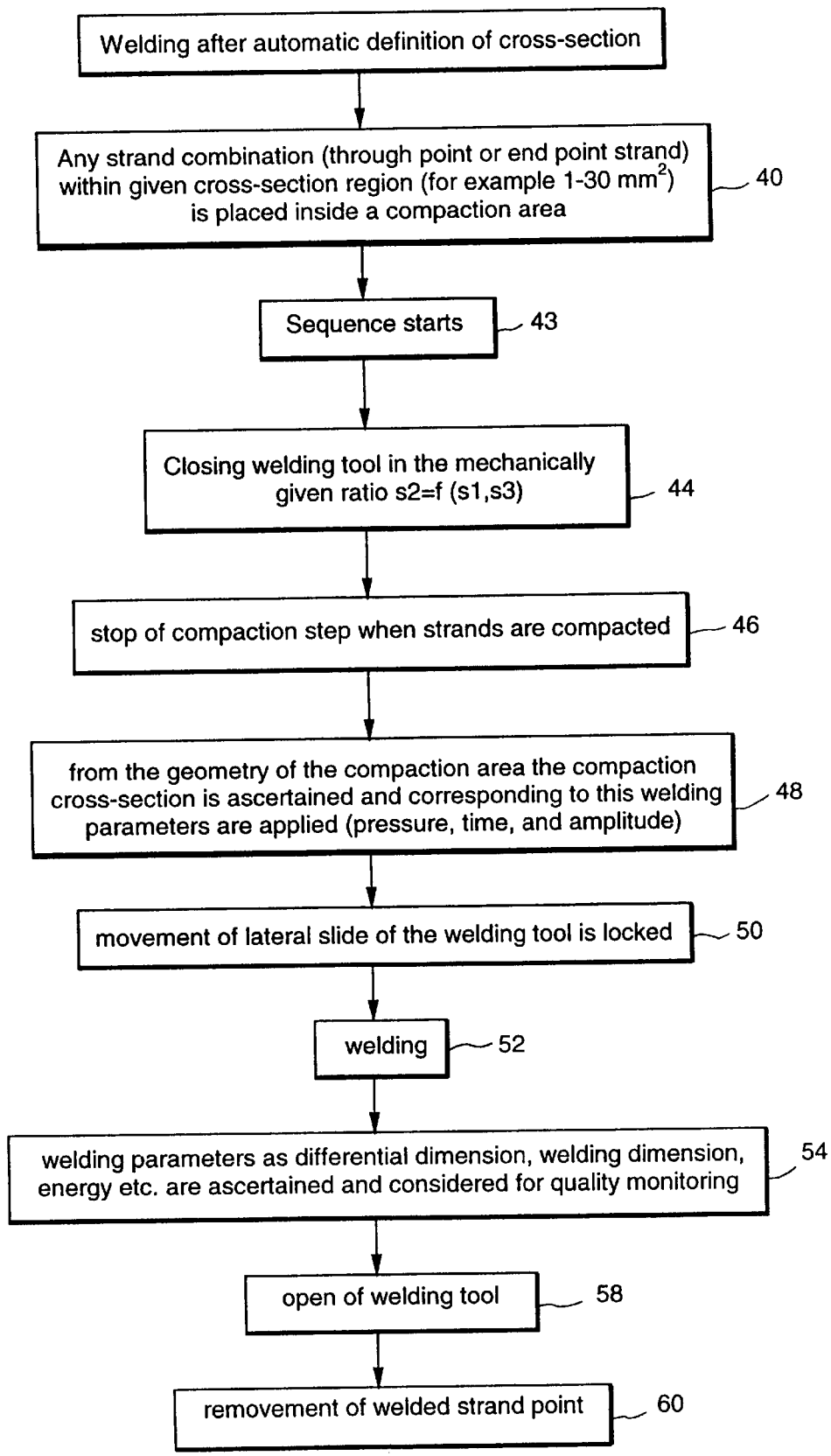
FIG. 3 shows a flow chart of a process sequence for welding of electric conductors.

The respective process sequence is shown in the flow chart in FIG. 3.

At first, a strand combination is placed inside the compaction area (10) (step (40)). Then, the sequence starts (step (43)). The compaction area (10) is closed, with height and width assuming a fixed ratio to one another. The height and width are here dependent on the type of coupling of the parts (24), (26) and (28) forming the counter-electrode and the coupling mechanism, curved part (30), nose portion (32) and lever (76) connecting the parts of the counter electrode. After closing the welding tool (step (44)) and completion of compaction (step (46)), the compaction cross-section is ascertained from the geometry of the compaction area (10), which is determined solely by knowing the height or width or another specific quantity, and corresponding to this, the welding parameters previously stored in the apparatus, such as pressure, time, and amplitude, are applied (step (48)). At the same time, a further movement of the slide (24) is prevented. To that end, the slide (24) is locked (step (50)). The welding is carried out (step (52)), where only the height (h) is reduced.

It would, of course, also be possible during welding to vary both the height (h) and the width (b) of the compaction area (10).

In order to permit quality monitoring or, if necessary, to optimize the welding parameters preset according to step (48), the actual values of the welded conductors, i.e. the welding parameters, such as differential dimension, welding dimension or energy, are ascertained (step (54)).

Then the welding area is opened (step (58)) in order to remove the welded conductors (step (60)). Strands for welding can then be placed again in the compaction area (10) without their cross-section having to be known beforehand.

What is claimed is:

1. A method for welding of electrical conductors in a compaction area having a height and a width comprising:
    introducing the conductors in the compaction area;
    compacting the conductors by adjusting the height and the width of the compaction area according to a predetermined height/width ratio;
    after ending compacting of the conductors, welding the conductors by operating an ultrasonic device according to predetermined welding parameters depending on the height or width, or at least one other characteristic dimension feature of said compaction area after compacting has ended.

2. The method according to claim 1, wherein the height of the compaction area is reduced and the width remains constant while compacted conductors are exposed to ultrasound from the ultrasonic device.

3. The method according to claim 1, wherein the width of the compaction area is reduced and the height remains constant while compacted conductors are exposed to ultrasound from the ultrasonic device.

4. The method of claim 1, wherein compacting is ended by a force which is independent of the conductors cross section.

5. The method of claim 1 wherein the welding parameters are selected from the group consisting of pressure, time and amplitude.

6. A method for welding electric conductors by means of ultrasound, employing a compaction area adjustable in height (h) and width (b) and accommodating the conductors where one limiting surface of the compaction area is formed by a sonotrode surface of an ultrasonic welding apparatus, said method comprising:
    inserting conductors to be welded into the compaction area;
    compacting the conductors in the compaction area up to a preset contact force by simultaneously reducing the compaction area on the basis of a fixed height/width ratio;
    determining either the height or width or one other characteristic dimension feature of the compaction area after the compaction is completed;
    retrieving stored welding parameters based on the one of the height or the width or one other characteristic dimension feature of the compaction area;
    ultrasonically welding the compacted conductors while simultaneously reducing the compaction area height and removing the welded conductor.

7. The method according to claim 6, wherein the welding parameters are stored in the welding apparatus.

8. The method according to claim 6, wherein compacting is completed by a force independent of conductors cross section.

9. A method for welding of electrical conductors in a compaction area having a height and a width comprising:
   introducing the conductors in the compaction area;
   compacting the conductors by adjusting the height and the width of the compaction area according to a predetermined height/width ratio;
   ending compacting at a predetermined compacting parameter, and
   operating an ultrasonic device according to predetermined welding parameters.

10. The method according to claim 9, wherein the height of the compaction area is reduced and the width remains constant while compacted conductors are exposed to ultrasound from the ultrasonic device.

11. The method of claim 9, wherein a compacting parameter is a pressure.

12. The method of claim 9, wherein a compacting parameter is a predetermined width reduction.

13. The method of claim 9, wherein the welding parameters are pressure, time and amplitude.

14. A method for welding electric conductors by means of ultrasound, employing a compaction area adjustable in height (h) and width (b) and accommodating the conductors, where one limiting surface of the compaction area is formed by a sonotrode surface of an ultrasonic welding apparatus, said method comprising:
   inserting conductors to be welded into the compaction area;
   compacting the conductors in the compaction area up to a preset contact force by simultaneously reducing the compaction area on the basis of a fixed height/width ratio;
   determining either the height or width, the compaction area compacting to a preset pressure;
   retrieving stored welding parameters based on the one of the height and the width of the compaction area;
   ultrasonically welding the compacted conductors while simultaneously reducing the compaction area height, and removing the welded conductor.

15. The method according to claim 14, wherein the welding parameters are stored in the welding apparatus.

\* \* \* \* \*